US010288739B1

(12) United States Patent
Aab et al.

(10) Patent No.: US 10,288,739 B1
(45) Date of Patent: May 14, 2019

(54) VALIDATION OF REGIONAL AUGMENTATION DATA FOR MILITARY USE

(71) Applicants: Steven D. Aab, Robins, IA (US); Ethan C. Bolte, Hiawatha, IA (US)

(72) Inventors: Steven D. Aab, Robins, IA (US); Ethan C. Bolte, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 701 days.

(21) Appl. No.: 14/640,383

(22) Filed: Mar. 6, 2015

(51) Int. Cl.
*G01S 19/05* (2010.01)
*G01S 19/18* (2010.01)

(52) U.S. Cl.
CPC .............. *G01S 19/05* (2013.01); *G01S 19/18* (2013.01)

(58) Field of Classification Search
CPC ........................................................ G01S 19/18
USPC .................................................. 342/357.42
See application file for complete search history.

(56) References Cited

U.S. PATENT DOCUMENTS

| 6,018,314 A * | 1/2000 | Harshbarger ........... G01S 19/18 342/357.43 |
| 2005/0146459 A1* | 7/2005 | Dentinger ............. G01S 5/0072 342/357.58 |

OTHER PUBLICATIONS

J. McNeff, "Changing the Game Changer. The Way Ahead for Military PNT", Inside GNSS. (Year: 2010).*

* cited by examiner

*Primary Examiner* — Vladimir Magloire
*Assistant Examiner* — Helena H Seraydaryan
(74) *Attorney, Agent, or Firm* — Angel N. Gerdzhikov; Donna P. Suchy; Daniel M. Barbieri

(57) ABSTRACT

A computer system receives a military global navigation satellite system signal and a terrestrial civilian signal comprising augmentation data. The computer system parses the civilian augmentation data and verifies some component of the augmentation data by comparison to verified military augmentation data. A minimum quality factor defines the number of data elements that must be in agreement between the military augmentation data and civilian augmentation data. The civilian augmentation data is then incorporated into the military global navigation satellite system.

18 Claims, 3 Drawing Sheets

VALIDATION OF REGIONAL AUGMENTATION DATA FOR MILITARY USE

FIELD OF THE INVENTIVE CONCEPTS

The inventive concepts disclosed herein are directed generally toward satellite based navigation and more particularly toward augmenting satellite based navigation with civilian systems for military use.

BACKGROUND

Global navigation satellite systems often employ augmentation data from sources outside the satellite based navigation system to enhance the accuracy of the system; for example, Global Positioning System (GPS) altitude data is generally not approved as a primary means of navigation because of the lack of observability in the vertical direction. Civilian users can utilize global navigation satellite system augmentation data to overcome this restriction. These services provide a value added benefit as a source for differential corrections as well as integrity alerts and other information such as ionospheric mapping.

Such augmentation data generally originates from civilian sources. Ground based augmentation data may comprise local correction data, dependent on the user's distance to the reference receiver, and broadcast over a terrestrial link. Space based augmentation data may comprise regional correction data broadcast over a satellite link.

Military users typically do not have access to civilian augmentation data because military users require a higher degree of data validation and there is no defined mechanism to validate and authenticate civilian augmentation data.

Consequently, it would be advantageous if an apparatus existed that is suitable for sufficiently validating and authenticating augmentation data for military use.

SUMMARY

Accordingly, embodiments of the inventive concepts disclosed herein are directed to a novel method and apparatus for validating and authenticating augmentation data for military use.

In some embodiments, a computer system receives a military global navigation satellite system signal and a terrestrial civilian signal comprising augmentation data. The computer system parses the augmentation data and verifies some component of the augmentation data to within a pre-defined threshold.

In other embodiments, a method for validating augmentation data for use with a military global navigation satellite system includes receiving augmentation data, validating some portion of the augmentation data by comparison to verified military augmentation data, and incorporating the civilian augmentation data into the military global navigation satellite system.

It is to be understood that both the foregoing general description and the following detailed description are exemplary and explanatory only and are not restrictive of the claimed inventive concepts. The accompanying drawings, which are incorporated in and constitute a part of the specification, illustrate embodiments of the inventive concepts and together with the general description, serve to explain the principles.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
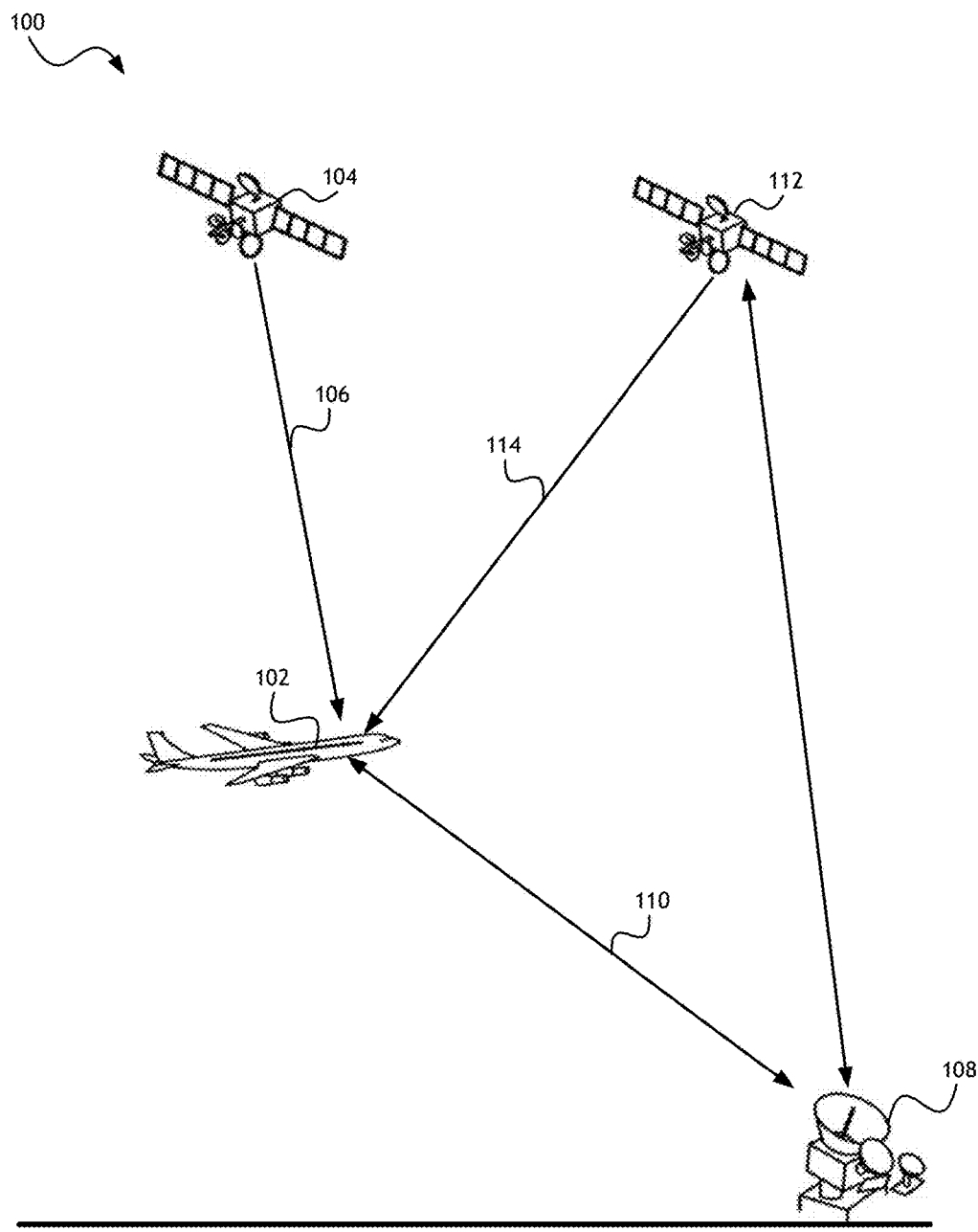
FIG. 1 shows a block diagram of a system for delivering augmentation data for a global navigation satellite system.

Referring to FIG. 1, a block diagram of a system 100 for delivering augmentation data for a global navigation satellite system 100 is shown. In some embodiments, a vehicle, such as an aircraft 102, including a global navigation satellite system 100 configured for military use receives a navigation signal 106 from a navigation satellite 104 (or a plurality of navigation satellites 104 as appropriate). The navigation signal 106 may not be sufficiently precise for certain applications: for example, to meet the requirements of a Category I approach and landing.

Where the navigation signal 106 is not precise enough for a particular application, the aircraft 102 may incorporate ground based augmentation data 110 from one or more ground stations 108 and/or space based augmentation data 114 from one or more satellites 112. Ground based augmentation data 110 and space based augmentation data 114 may include satellite position corrections, satellite clock corrections, ionospheric error corrections, and signal integrity parameters.

In military applications, ground based augmentation data 110 and space based augmentation data 114 are generally not employed because ground based augmentation data 110 and space based augmentation data 114 are not verifiable.

Military users have access to low-rate differential/augmentation data such as Zero-Age-of-Data (ZOAD), Talon NAMATH, Wide Area GPS Enhancement (WAGE), and Internet-based Global Differential GPS (IGDG). Military augmentation data sources are trusted but are low-rate and may contain integrity information.

In some embodiments, a military vehicle, such as the aircraft 102, may receive ground based augmentation data 110 and space based augmentation data 114 and may verify one or more elements of data against known, good data from military augmentation data sources to establish the veracity of the remaining ground based augmentation data 110 and space based augmentation data 114. In some embodiments data verification occurs at a rate sufficient to support time-to-alarm metrics defined by a desired application, such as the requirements for a Category I approach and landing.

Ground based augmentation data 110 and space based augmentation data 114 are signals-of-opportunity that can be used to provide military users the capability to perform procedures and operations that require precision navigation and position, velocity, and time information.

While the present embodiment discusses an aircraft 102, a person skilled in the art may appreciate that other vehicles and applications are envisioned, including terrestrial, marine, and space vehicles or platforms.

Figure 2:
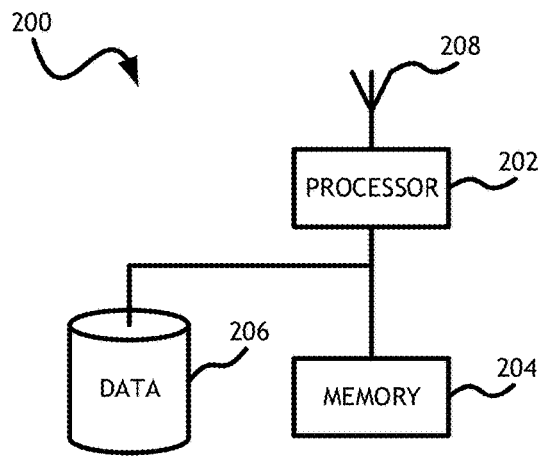
FIG. 2 shows a block diagram of a system according to an embodiment of the inventive concepts disclosed herein.

Referring to FIG. 2, a block diagram of a system 200 suitable according to an exemplary embodiment of the inventive concepts disclosed herein is shown. The system 200 includes a processor 202, a memory 204 connected to the processor 202 for storing computer executable program code, a data storage element 206 for storing global navigation satellite system data and augmentation data, and one or more antennas 208 for communicating with one or more global navigation satellite system satellites, one or more communication satellites, and/or one or more ground stations.

In some embodiments, the processor 202 receives a global navigation satellite system signal through one of the one or more antennas 208 and resolves the location of the system 200 with reference to a number of satellites from the global navigation satellite system. The processor 202 also receives military augmentation data comprising verified augmentation data and civilian augmentation data from one or more sources-of-opportunity. The processor 202 compares corresponding data sets from military augmentation data sources and civilian augmentation data sources to verify the veracity the civilian augmentation data. The processor 202 then either incorporates verified civilian augmentation data or rejects unverified civilian augmentation data to produce an augmented global navigation satellite system signal. The augmented global navigation satellite system signal may be stored in the memory 204 or sent to related on-board systems to control an aircraft.

In some embodiments, the processor 202 maps every element of augmentation data from verified military augmentation data sources to corresponding elements of augmentation data from a civilian source-of-opportunity. The processor 202 determines a threshold number or percentage of corresponding elements of augmentation data that must be identical or consistent in order to verify the civilian source-of-opportunity. Such number or percentage may be considered a quality factor necessary to incorporate civilian augmentation data.

In some embodiments, the processor 202 receives military augmentation data from one or more military augmentation data sources and civilian augmentation data from two or more civilian augmentation data sources. Where a particular set of elements of augmentation data from a first civilian augmentation data source is verified against the military augmentation data sources such that the first civilian augmentation data source is verified, but there are no corresponding augmentation data elements in a second civilian augmentation data source to verify against the military augmentation data sources, the first civilian augmentation data source may be used to verify the second civilian augmentation data source.

Figure 3:
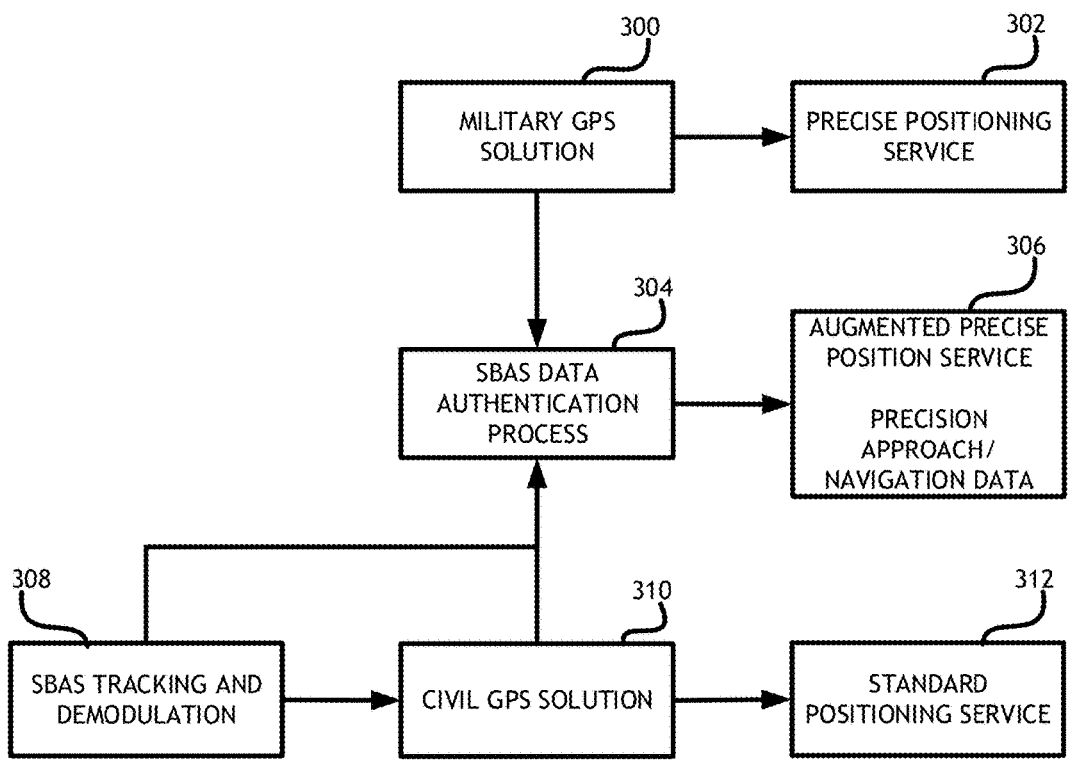
FIG. 3 shows diagram flow chart of one embodiment of the inventive concepts disclosed herein.

Referring to FIG. 3, a flow chart of one embodiment of the present invention is shown. Military global navigation satellite systems 300, such as GPS, provide a precise position 302. That precise position 302 may be enhanced as to position, velocity, time deterministic corrections, and satellite signal integrity by verified military augmentation data if such data is available, and only at the low rate such data is generally delivered.

Civilian GPS 310 may utilize data from a Satellite Based Augmentation System (SBAS) 308 to provide a standard position 312, possibly enhanced as to position, velocity, time, and satellite integrity depending on what data is available from the SBAS 308. SBAS 308 data may be grouped into three main categories: ionospheric corrections, integrity data and alarms, and satellite position and clock corrections.

In some embodiments, an SBAS authentication process 304 as described herein receives the verified military augmentation data corresponding to the military global navigation satellite systems 300, and SBAS 308 data. The SBAS authentication process 304 compares augmentation data elements from the SBAS 308 to corresponding augmentation data elements from the verified military augmentation data to determine the veracity of data from the SBAS 308. The SBAS authentication process 304 thereby produces 306 an augmented precise position and precision approach and navigation data suitable for military use.

Figure 4:
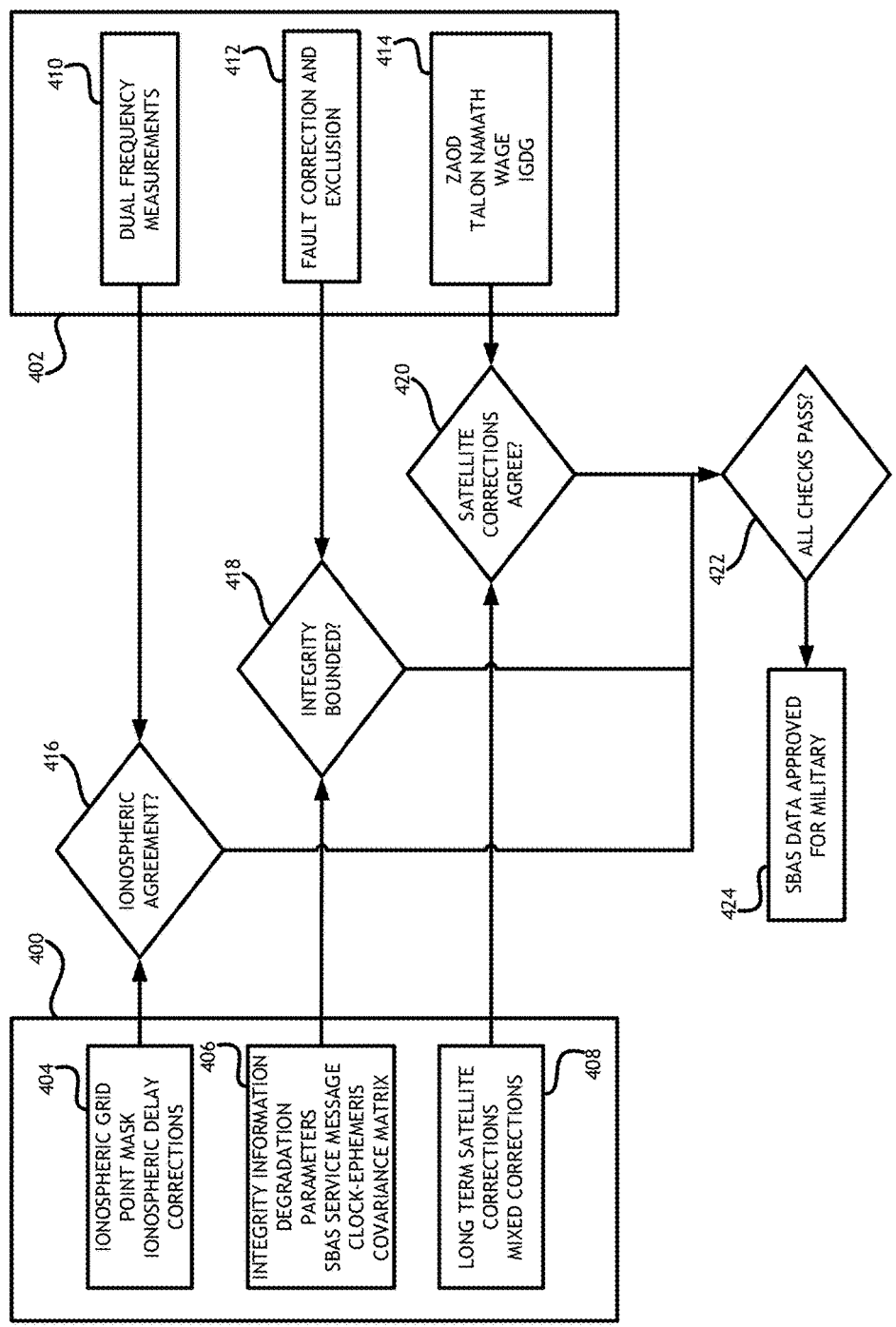
FIG. 4 shows a flow chart according to an exemplary embodiment of the inventive concepts disclosed herein.

Referring to FIG. 4, a flow chart according to an exemplary embodiment of the inventive concepts disclosed herein is shown. SBAS data 400 and military augmentation data 402 are compared for agreement by grouping the available data into categories. In some embodiments, civilian ionospheric correction data 404 is compared 416 to military ionospheric correction data 410 for agreement. Civilian ionospheric correction data 404 may include ionospheric grid point mask messages and ionospheric delay corrections. Military ionospheric correction data 410 may include dual frequency measurements.

In some embodiments, civilian integrity data and alarms 406 are compared 418 to military integrity data and alarms 412 to determine if integrity is properly bounded. Civilian integrity data and alarms 406 may include integrity information, degradation parameters, SBAS service messages, and a clock-ephemeris covariance matrix. Military integrity data and alarms 412 may include fault detection and exclusion.

In some embodiments, civilian satellite position and clock corrections 408 are compared 420 to military satellite position and clock corrections 414 for agreement. Civilian satellite position and clock corrections 408 may include long-term satellite corrections and mixed corrections. Military satellite position and clock corrections 414 may originate from ZAOD, Talon NAMATH, WAGE, or IGDG.

If it is determined 422 that the compared 416 ionospheric data is in agreement, that the available integrity data is properly bounded 418, and that the compared 420 satellite position and clock corrections agree, then all checks pass and the SBAS data 400 is approved 424 for military use.

A military aircraft utilizing a global navigation satellite system including embodiments of the inventive concepts disclosed herein may make precision approaches to non-published runways, increase the accuracy and integrity for low visibility operations, and increase positional integrity for search and rescue operations in low visibility or brown out conditions.

It is believed that the inventive concepts disclosed herein and many of their attendant advantages will be understood by the foregoing description, and it will be apparent that various changes may be made in the form, construction, and arrangement of the components thereof without departing from the scope and spirit of the inventive concepts disclosed herein or without sacrificing all of its material advantages. The form herein before described being merely an explanatory embodiment thereof, it is the intention of the following claims to encompass and include such changes.

What is claimed is:

1. A computer system for augmenting a military global navigation satellite system, comprising:
    a processor;
    a memory connected to the processor;
    one or more antennas connected to the processor;
    processor executable code, stored in the memory, configured to instruct the processor to:
        receive a global navigation satellite signal;
        receive an augmentation data signal from a military source comprising:
            verified ionospheric correction data including dual frequency measurements;
            verified integrity data and alarms including fault detection and exclusions; and
            verified satellite position and clock corrections from as least one of Zero-Age-of-Data (ZOAD), and Talon NAMATH;
        parse the augmentation data signal from the military source into a first set of discrete elements, and organizing the discrete elements into groups comprising ionospheric data, integrity data, and satellite correction data;
        receive an augmentation data signal from a civilian source comprising:
            unverified ionospheric correction data including ionospheric grid point mask messages and ionospheric delay corrections;
            unverified integrity data and alarms including integrity information, degradation parameters, and a clock-ephemeris covariance matrix; and
            unverified satellite position and clock corrections;
        parse the augmentation data signal from the civilian source into a second set of discrete elements, and organizing the discrete elements into groups comprising ionospheric data, integrity data, and satellite correction data unverified augmentation data and a third set of discrete elements comprising Satellite Base Augmentation System (SBAS) service messages;
        correlate the groups of the first set of discrete elements to the groups of the second set of discrete elements;
        compare the correlated groups by determining if the ionospheric data of the first set of discrete element agrees with the ionospheric data of the second set of discrete element, determining if the integrity data of the first set of discrete element agrees with the integrity data of the second set of discrete element, and determining if the satellite correction data of the first set of discrete element agrees with the satellite correction data of the second set of discrete element; and
        flag the third set of discrete element as verified for military use if it is determined that all of the groups from the first set of discrete elements agree with the groups from the second set of discrete elements,
        wherein the augmentation data signal from the military source comprises:
            a lower data rate signal than the augmentation data signal from the civilian source.

2. The system of claim 1, wherein the processor executable code is further configured to instruct the processor to augment the global navigation satellite signal with the third set of discrete elements.

3. The system of claim 1, wherein the augmentation data signal from the civilian source is a first augmentation data signal from the civilian source and wherein the processor executable code is further configured to instruct the processor to:
    receive a second augmentation data signal from the civilian source;
    parse the second augmentation data signal from the civilian source into a fourth set of discrete elements comprising unverified augmentation data;
    correlate one or more of the fourth set of discrete elements one or more elements of the first set of discrete elements;
    compare the correlated discrete elements of first set of discrete elements to the elements of the fourth set of discrete elements to determine the veracity of the fourth set of discrete elements; and
    flag the second augmentation data signal from the civilian source as verified.

4. The system of claim 3, wherein the processor executable code is further configured to instruct the processor to augment the global navigation satellite signal with the second augmentation data signal from the civilian source.

5. The system of claim 1, wherein the augmentation data signal from the civilian source is a first augmentation data signal from the civilian source and wherein the processor executable code is further configured to instruct the processor to:
    receive a second augmentation data signal from the civilian source;
    parse the second augmentation data signal from the civilian source into a fourth set of discrete elements comprising unverified augmentation data;
    correlate the fourth set of discrete elements to one or more of the third set of discrete elements;
    compare the correlated elements of the fourth set of discrete elements to the third set of discrete elements to determine the veracity of the fourth set of discrete elements; and
    flag the fourth set of discrete elements as verified.

6. The system of claim 5, wherein the processor executable code is further configured to instruct the processor to augment the global satellite navigation signal with the fourth set of discrete elements.

7. A method for verifying satellite navigation augmentation data, comprising:
    receiving a global navigation satellite signal;
    receiving an augmentation data signal from a military source comprising:
        verified ionospheric correction data including dual frequency measurements;
        verified integrity data and alarms including fault detection and exclusions; and
        verified satellite position and clock corrections from as least one of Zero-Age-of-Data (ZOAD), and Talon NAMATH;
    parsing the augmentation data signal from the military source into discrete elements, and organizing the discrete elements into groups comprising ionospheric data, integrity data, and satellite correction data;
    receiving a augmentation data signal from a civilian source comprising:
        unverified ionospheric correction data including ionospheric grid point mask messages and ionospheric delay corrections;
        unverified integrity data and alarms including integrity information, degradation parameters, and a clock-ephemeris covariance matrix; and
        unverified satellite position and clock corrections;

parsing the augmentation data signal from the civilian source into discrete elements, and organizing the discrete elements into groups comprising ionospheric data, integrity data, and satellite correction data of unverified augmentation data;

correlating the groups of discrete elements of verified augmentation data to the groups of discrete elements of unverified augmentation data;

comparing the correlated groups by determining if the ionospheric data of the first set of discrete element agrees with the ionospheric data of the second set of discrete element, determining if the integrity data of the first set of discrete element agrees with the integrity data of the second set of discrete element, and determining if the satellite correction data of the first set of discrete element agrees with the satellite correction data of the second set of discrete element; and flagging uncorrelated, unverified augmentation data as verified if it is determined that all of the groups from the first set of discrete elements agree with the groups from the second set of discrete elements, wherein the augmentation data signal from the military source comprises:
a lower data rate signal than the augmentation data signal from the civilian source.

8. The method of claim 7, further comprising incorporating the flagged augmentation data into the global navigation satellite signal.

9. The method of claim 7, further comprising:
receiving a second augmentation data signal from the civilian source;
parsing the second augmentation data signal from the civilian source into a second set of discrete elements of unverified augmentation data;
correlating the second set of discrete elements of unverified augmentation data to one or more elements of verified augmentation data;
comparing the correlated elements of verified augmentation data to the elements of unverified augmentation data to determine the veracity of the second set of discrete elements of unverified augmentation data; and
flagging uncorrelated, unverified augmentation data in the second set of discrete elements of unverified augmentation data as verified.

10. The method of claim 9, further comprising incorporating the flagged second set of discrete elements of augmentation data into the global navigation satellite signal.

11. The method of claim 7, further comprising:
receiving a second augmentation data signal from the civilian source;
parsing the second augmentation data signal from the civilian source into a second set of discrete elements of unverified augmentation data;
correlating the second set of discrete elements of unverified augmentation data to one or more elements of augmentation data from the augmentation data signal from the civilian source uncorrelated to verified augmentation data;
comparing the correlated elements of the second set of discrete elements of unverified augmentation data the augmentation data from the augmentation data signal from the civilian source uncorrelated to verified augmentation data to determine the veracity of the second set of discrete elements of unverified augmentation data; and
flagging the second set of discrete elements of unverified augmentation data as verified.

12. The method of claim 11, further comprising incorporating the flagged second set of discrete elements of augmentation data into the global navigation satellite signal.

13. An aircraft comprising:
a global navigation satellite system comprising:
a processor;
memory connected to the processor;
a satellite antenna connected to the processor, configured to receive a global navigation satellite system signal;
a data link antenna connected to the processor;
computer executable program code, stored in the memory, configured to instruct the processor to:
receive a global navigation satellite signal through the satellite antenna;
receive an augmentation data signal from a military source through the datalink antenna, the augmentation data comprising:
verified ionospheric correction data including dual frequency measurements;
verified integrity data and alarms including fault detection and exclusions; and
verified satellite position and clock corrections from as least one of Zero-Age-of-Data (ZOAD), and Talon NAMATH;
parse the augmentation data signal from the military source into discrete elements, and organizing the discrete elements into groups comprising ionospheric data, integrity data, and satellite correction data;
receive an augmentation data signal from a civilian source through the datalink antenna, the augmentation data comprising:
unverified ionospheric correction data including ionospheric grid point mask messages and ionospheric delay corrections;
unverified integrity data and alarms including integrity information, degradation parameters, and a clock-ephemeris covariance matrix; and
unverified satellite position and clock corrections;
parse the augmentation data signal from the civilian source into discrete elements, and organizing the discrete elements into groups comprising ionospheric data, integrity data, and satellite correction data;
correlate the groups of discrete elements of verified augmentation data to the groups of discrete elements of unverified augmentation data;
compare the correlated groups by determining if the ionospheric data of the first set of discrete element agrees with the ionospheric data of the second set of discrete element, determining if the integrity data of the first set of discrete element agrees with the integrity data of the second set of discrete element, and determining if the satellite correction data of the first set of discrete element agrees with the satellite correction data of the second set of discrete element; and
flag uncorrelated, unverified augmentation data as verified for military use if it is determined that all of the groups from the first set of discrete elements agree with the groups from the second set of discrete elements,
wherein the augmentation data signal from the military source comprises:
a lower data rate signal than the augmentation data signal from the civilian source.

14. The aircraft of claim 13, wherein the computer executable program code is further configured to instruct the processor to incorporating the flagged augmentation data into the global navigation satellite signal.

15. The aircraft of claim 13, wherein the computer executable program code is further configured to instruct the processor to:
- receive a second augmentation data signal from the civilian source;
- parse the second augmentation data signal from the civilian source into a second set of discrete elements of unverified augmentation data;
- correlate the second set of discrete elements of unverified augmentation data to one or more elements of verified augmentation data;
- compare the correlated elements of verified augmentation data to the elements of unverified augmentation data to determine the veracity of the second set of discrete elements of unverified augmentation data; and
- flag uncorrelated, unverified augmentation data in the second set of discrete elements of unverified augmentation data as verified.

16. The aircraft of claim 15, wherein the computer executable program code is further configured to instruct the processor to incorporate the flagged second set of discrete elements of augmentation data into the global navigation satellite signal.

17. The aircraft of claim 13, wherein the computer executable program code is further configured to instruct the processor to:
- receive a second augmentation data signal from the civilian source;
- parse the second augmentation data signal from the civilian source into a second set of discrete elements of unverified augmentation data;
- correlate the second set of discrete elements of unverified augmentation data to one or more elements of augmentation data from the augmentation data signal from the civilian source uncorrelated to verified augmentation data;
- compare the correlated elements of the second set of discrete elements of unverified augmentation data the augmentation data from the civilian augmentation data signal uncorrelated to verified augmentation data to determine the veracity of the second set of discrete elements of unverified augmentation data; and
- flag the second set of discrete elements of unverified augmentation data as verified.

18. The aircraft of claim 17, wherein the computer executable program code is further configured to instruct the processor to incorporate the flagged second set of discrete elements of augmentation data into the global navigation satellite signal.

* * * * *